No. 875,391. PATENTED DEC. 31, 1907.
W. T. TINSLEY.
DEVICE FOR CUTTING BARK FROM TREES.
APPLICATION FILED APR. 18, 1906.
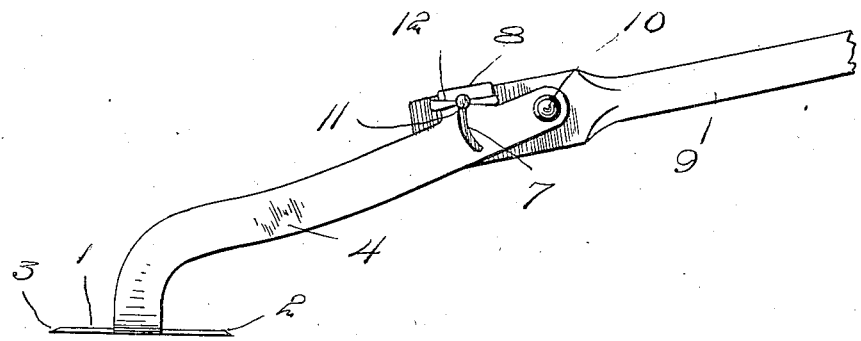
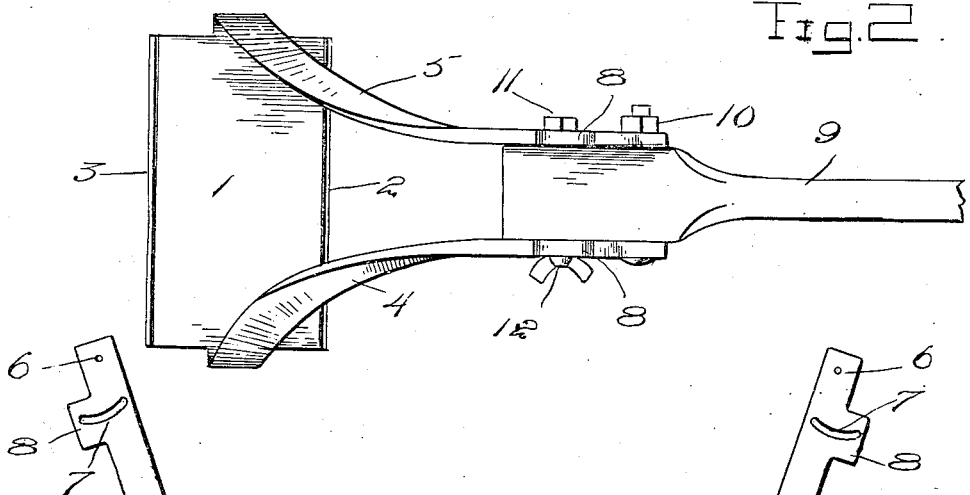
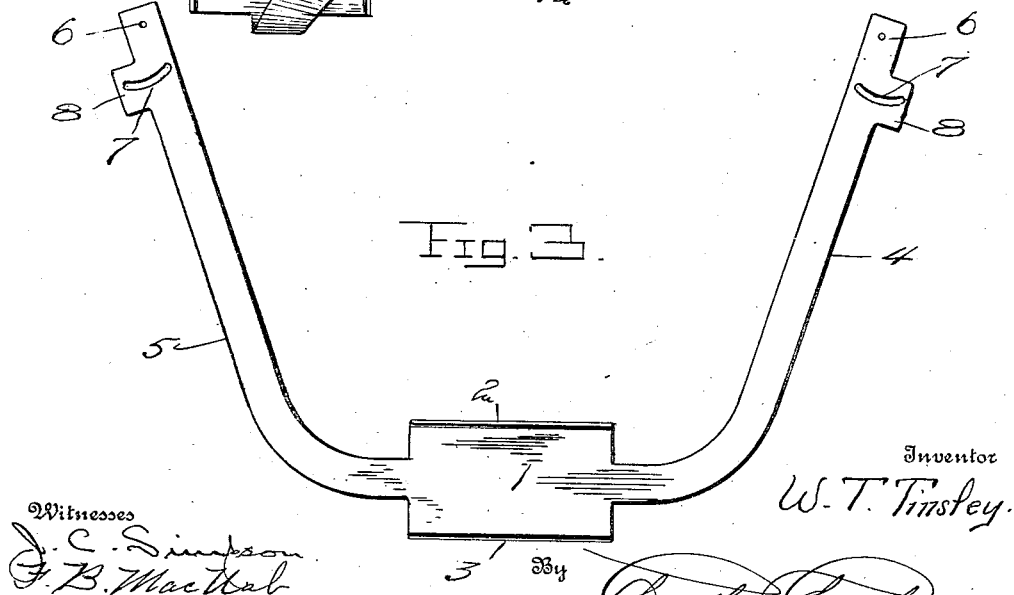

UNITED STATES PATENT OFFICE.

WILLIAM T. TINSLEY, OF CUSTER, SOUTH DAKOTA.

DEVICE FOR CUTTING BARK FROM TREES.

No. 875,391.  Specification of Letters Patent.  Patented Dec. 31, 1907.

Application filed April 18, 1906. Serial No. 312,465.

*To all whom it may concern:*

Be it known that I, WILLIAM T. TINSLEY, a citizen of the United States, residing at Custer, in the county of Custer, State of South Dakota, have invented certain new and useful Improvements in Devices for Cutting Bark from Trees; and I do hereby declare the following to be a full, clear, and exact description of the invention, such as will enable others skilled in the art to which it appertains to make and use the same.

This invention relates to bark-peeling tools, particularly designed for removing the bark from felled trees.

The object of the invention is to provide a device which will remove the bark in a simple and efficient manner.

Another object is to provide an adjustable peeling scraping blade.

In the accompanying drawings:—Figure 1 is a side elevation. Fig. 2 is a top plan view. Fig. 3 is a plan view of the blank from which the blade and shanks are formed.

In the drawings, 1 represents the blade of the tool provided with the cutting edges 2 and 3, and the shanks 4 and 5. The shanks 4 and 5 integral with the blade extend from opposite ends of the latter and are bent upwardly from the blade and then rearwardly being given a quarter twist about middle way of their lengths so as at their ends to extend in a plane at a right angle with the blade and are provided with the holes 6 in their ends and with the arc-shaped slots 7 in the wider portion 8.

The blade 1 is secured to the handle 9 by bolts 10 11 which pass through the alining holes 6 and the alining slots 7, respectively. The bolt 11 has a thumb-screw 12 disposed thereon, which can be readily operated or secured upon the bolt to draw the shanks tightly against the handle.

The blade can be adjusted with respect to the handle by moving it upon the bolt 10 as a pivot and can be secured in its adjusted position by operating the thumb-screw. The idea of adjusting the blade is to make the implement more convenient for a tall or short man, or to make it more convenient for a man to peel the timbers while in different positions, as standing upon the timber itself or upon the ground.

The blade having the cutting edges 2 and 3 on opposite sides thereof, can be used for peeling the bark from the timber by either drawing or pushing.

It is to be noted that the ends of the blade 1 for a very material distance inward from their edges 2 and 3 are free of obstructions of any kind or character. This is necessary in order that the edge of the blade may enter between the bark and the wood and peel the former from the latter. If the edges of the blade were materially obstructed by upstanding or downwardly projecting features at the ends the device could not be operated effectively in peeling bark, particularly when the same is bound to an appreciable degree to the wood. It will also be noted that my improved implement is particularly applicable to peeling the bark from small timber and the limbs of trees, especially where the barker is compelled to reach upward, and where both a push and pull action is desirable.

What is claimed, is:—

A bark peeling instrument comprising a flat blade 1, integral shanks 4 and 5 extended upwardly from opposite ends of the blade and then rearwardly and convergently, said shanks, adjacent their rear ends, having a quarter twist, whereby said rear ends are disposed in planes at right angles to the blade, the rear ends of said shanks being formed at their extremities with apertures, and inwardly of said apertures with vertical arcuate slots, a handle, a pivot bolt engaged through said handles and through said apertures, a bolt engaged through said handle and said slot and an adjusting thumb screw threaded upon the end of said last named bolt.

In testimony whereof, I affix my signature, in presence of two witnesses.

WILLIAM T. TINSLEY.

Witnesses:
HENRY E. WAY,
WILLIAM H. PALMER, Jr.